United States Patent [19]

Kaneko et al.

[11] 4,125,654
[45] Nov. 14, 1978

[54] INFORMATION SIGNAL RECORDING DISC

[75] Inventors: Akira Kaneko; Masaki Ohya; Masayasu Suzuki; Akio Kobayashi, all of Iwaki, Japan

[73] Assignee: Kureha Kagaku Kogyo Kabushiki Kaisha, Tokyo, Japan

[21] Appl. No.: 804,758

[22] Filed: Jun. 8, 1977

[30] Foreign Application Priority Data

Jun. 11, 1976 [JP] Japan .................................. 51-68406
Jun. 18, 1976 [JP] Japan .................................. 51-72022
Dec. 10, 1976 [JP] Japan ................................. 51-148538

[51] Int. Cl.² ........................ H04N 1/28; H04N 1/30; C08L 9/02; B32B 27/32
[52] U.S. Cl. .................. 428/64; 260/29.7 T; 260/879; 274/41 A; 274/41.6 S; 428/520; 428/522; 526/328; 526/329
[58] Field of Search .......................... 260/29.7 T, 879; 274/41 A, 41.6 S; 526/328, 329; 428/522, 520, 64

[56] References Cited

U.S. PATENT DOCUMENTS

| | | | |
|---|---|---|---|
| 2,997,451 | 8/1961 | Miller | 274/41 A |
| 3,130,065 | 4/1964 | Manning et al. | 428/520 X |
| 3,549,725 | 12/1970 | Rose et al. | 260/879 |
| 3,690,946 | 9/1972 | Hartmann et al. | 428/522 X |
| 3,730,767 | 5/1973 | Akashi et al. | 428/64 |
| 3,832,274 | 8/1974 | Owston | 260/879 X |
| 4,046,932 | 9/1977 | Hartmann et al. | 428/64 |
| 4,057,831 | 11/1977 | Jacobs et al. | 428/64 X |
| 4,058,649 | 11/1977 | Steiner | 428/520 X |
| 4,065,521 | 12/1977 | Lachowicz et al. | 260/879 |

FOREIGN PATENT DOCUMENTS 645,105 10/1950 United Kingdom.

*Primary Examiner*—Harold Ansher
*Attorney, Agent, or Firm*—Wenderoth, Lind & Ponack

[57] ABSTRACT

A phonograph or video disc comprises at least one unsaturated nitrile copolymer and has therein an unsaturated nitrile content of from 40 to 90 percent by weight, and the disc exhibits a Clash-Berg flex temperature of from 50° to 120° C, an absorbed impact energy of at least 0.5kg.cm. when tested with a test specimen thereof of a 2-mm. thickness by a Dynstat impact test according to BS-1330-1946, and a Shore D hardness of from 75 to 95.

10 Claims, No Drawings

INFORMATION SIGNAL RECORDING DISC

BACKGROUND OF THE INVENTION

This invention relates generally to mediums for recording thereon information signals such as phonograph and video disc mediums and to materials therefor, the signals thus recorded being reproducible from the mediums. More particularly, the invention relates to a phonograph or video disc which is fabricated from a copolymer containing an unsaturated nitrile component and has highly desirable properties such as antistatic property, abrasion resistance, impact resistance, heat stability, transparency, and homogeneity.

The material mostly used for phonograph discs at present is a vinyl chloride — vinyl acetate copolymer of low molecular weight. Furthermore, as materials for video discs being developed recently, vinyl chloride resins produced by emulsion polymerization are being considered. Phonograph and video discs in which vinyl chloride resins are used are accompanied by a number of problems as described below.

1. The first problem is that a phonograph disc in which a vinyl chloride — vinyl acetate copolymer is used or a video disc in which a vinyl chloride (VC) resin produced by emulsion polymerization (hereinafter referred to collectively as "VC resin record discs") exhibits a conspicuous electrostatic charge accumulating characteristic (hereinafter referred to as "electrostatic characteristic"). This electrostatic characteristic is still of a remarkable degree even in the case where an antistatic agent has been applied as a coating on the surface of the phonograph disc or has been kneaded into the disc resin.

As is known, an electrostatic characteristic of this degree gives rise to attraction of dust in the air and the surroundings to the phonograph disc surface and thus into the recording groove. As a consequence of this dust in the groove, not only is noise generated at the time of reproducing (playing) of the record disc, but the serviceable life of the reproducing stylus is shortened, and the groove walls are damaged, whereby the serviceable life of the disc itself is reduced. While various cleaners for removing this dust in the disc groove are being sold on the market, they are troublesome because they must be used every time a disc is to be played. Furthermore, in the case of a video disc, the presence of dust in the disc groove has a greater deleterious effect because of the high-density recording.

2. The second problem is that vinyl chloride resins, particularly vinyl chloride resins produced by emulsion polymerization, have poor heat stability and their decomposition temperatures are close to their processing temperatures, whereby these resins readily decompose or undergo degeneration. In order to improve the heat stability of these resins, it is a common practice to add stabilizers thereto, but this measure cannot be said to be completely satisfactory. Moreover, a stabilizer agent used in this manner bleeds out of the surface of the record disc after forming and becomes a cause of noise.

3. The third problem is that, in order to produce resins of good formability and workability, these VC resins are produced with a low molecular weight and as copolymers with vinyl acetate. For this reason, these resins have poor heat resistance and poor abrasion resistance and, in the form of a record disc, are easily warped and easily scratched or scored.

Heretofore, new high-polymer materials in which the above described problems accompanying vinyl chloride resins have been overcome have been proposed. However because they entail other problems, they have not replaced VC resins for recording discs. For example, as is known, polystyrene resins have poor abrasion resistance and poor impact resistance, while polymethacrylate resins have poor fluidity at forming or molding, poor abrasion resistance, and poor impact resistance.

SUMMARY OF THE INVENTION

It is an object of this invention to provide a record disc in which the above described problems accompanying VC resin record discs and the record discs of resins other than VC resins are overcome, and which has excellent antistatic property, heat stability, heat resistance, abrasion resistance, impact resistance, and other desirable characteristics.

According to this invention, briefly summarized, there is provided an information signal recording disc such as a phonograph or video disc comprising at least one unsaturated nitrile copolymer and having therein an unsaturated nitrile content of from 40 to 90 percent by weight, said resin exhibiting a Clash-Berg flex temperature of from 50° to 120° C., an absorbed impact energy of at least 0.5 kg.cm. when tested with a test specimen thereof of a 2-mm. thickness by a Dynstat impact test according to BS-1330-1946, and a Shore D hardness of from 75 to 95.

The nature, utility, and further features of this invention will be more clearly apparent from the following detailed description beginning with a consideration of the general features of the invention and concluding with specific examples of practice illustrating preferred embodiments of the invention.

DETAILED DESCRIPTION

The recording disc of the present invention comprises at least one nitrile resin containing from 40 to 90 percent, preferably from 50 to 85 percent, by weight of an unsaturated nitrile. Typically representative unsaturated nitriles are acrylonitrile and methacrylonitrile. If the content of the unsaturated nitrile is less than 50 percent, particularly less than 40 percent, by weight, the electrostatic characteristic of the disc will increase. On the other hand, if this content exceeds 85 and, particularly if it exceeds 90 percent, by weight, the resin will become crystalline. This is undesirable since not only will the noise increase but, in the case of acrylonitrile, the heat stability will deteriorate.

Examples of a monomer which constitutes an unsaturated nitrile copolymer and is capable of copolymerizing with an unsaturated nitrile are conjugated diolefins, such as 1,3-butadiene; alkyl acrylates, such as methyl, ethyl, n-, i-propyl, and n-, i-, t-butyl acrylates; alkyl methacrylates, methyl, ethyl, n-, i-propyl, and n-, i-, t-butyl methacrylates; acrylic acid, methacrylic acid, acrylamide, methacrylamide, hydroxyalkyl methacrylate, polyethylene glycol acrylate, polyethyleneglycol methacrylate, acrylamide; vinyl acetate; aromatic vinyls, such as styrene; and alkyl vinyl ethers, such as methyl vinyl ether. When, of these monomers, an aromatic vinyl is used in a large quantity, the abrasion resistance of the product disc decreases. On the other hand, such monomers having a hydroxyl or an amide group as acrylic acid, methacrylic acid, acrylamide, methacrylamide, hydroxyalkyl acrylates, hydroxyalkyl methacrylates, polyethyleneglycol acrylates, and polyethyleneglycol methacrylates are more preferable because the resulting copolymers have higher antistatic property. The number of the oxyethylene groups in the polyethylene acrylates or methacrylates recited above are preferably 23 or less, more preferably 9 or less, because the copolymers of polyethyleneglycol acrylate or methacrylate having more than 23 oxyethylene groups in the polyethyleneglycol moiety have a tendency to turn white when such copolymers have absorbed moisture. The hydroxyalkyl moiety in the hydroxyalkyl acrylates and methacrylates preferably contains 1 to 8 carbon atoms, more preferably 2 to 4 carbon atoms.

For the unsaturated nitrile copolymer, a random copolymer, a graft copolymer, a mixture of these copolymers, or the like can be used.

In the case where the copolymer is a random copolymer, the copolymers of the increased impact strength or resistance can be provided by those comprising from 1 to 30 percent by weight of the component of a conjugated olefin as a monomer copolymerizable with the unsaturated nitrile. If this quantity exceeds 30 percent by weight, the softening point of the product becomes undesirably low.

In the case where the copolymer is a graft copolymer, it comprises from 1 to 30 parts by weight of a rubber trunk polymer and from 99 to 70 parts by weight of a polymer graft-polymerized thereonto. A quantity of the rubber-trunk polymer in a range of preferably from 5 to 20 parts by weight, still more preferably from 10 to 15 parts by weight, affords excellent impact resistance of the product. The component of the rubber-trunk polymer is selected from conjugated diolefins, alkyl acrylate esters, unsaturated nitriles, alkyl methacrylates, and multifunctional monomers and the like copolymerizable with these monomers, wherein either or both of the conjugated diolefin and an alkyl acrylate in which the alkyl group has from 2 to 12 carbon atoms is (are) the principal constitutional unit(s). For the multifunctional monomer, a known multifunctional monomer can be used.

The monomer mixture to be graft-polymerized preferably comprises: from 40 to 90 percent by weight, preferably from 50 to 85 percent by weight, of an unsaturated nitrile; from 7 to 60 percent by weight of at least one monomer selected from alkyl acrylates, (such as methyl, ethyl, n-, i-propyl, and n-, i-, t-butyl acrylates) alkyl methacrylates (such as methyl, ethyl, n-, i-propyl, and n-, i-, t-butyl, methacrylates), acrylic acid, methacrylic acid, acrylamide, methacrylamide, hydroxyalkyl acrylates (such as hydroxyethyl and hydroxypropyl acrylates), hydroxyalkyl methacrylates (such as hydroxyethyl and hydroxypropyl methacrylates), polyethyleneglycol acrylates, and polyethyleneglycol methacrylates, acrylamide, vinyl acetate, and alkyl vinyl ethers (such as methyl vinyl ether); and, if desired, 40 percent or less than 40 percent by weight of a monomer which is copolymerizable with the unsaturated nitrile and is different from the above named monomers.

The constituent resin of recording discs of this invention comprises at least one of the unsaturated nitrile copolymers and may contain, additionally, a small quantity of a resin differing from the unsaturated nitrile copolymer, preferably comprising only the above mentioned unsaturated nitrile copolymer.

For the constituent resin of this invention, a resin is prepared by copolymerization of the above mentioned resin constituents by a known polymerization process such as, for example, emulsion polymerization, suspension polymerization, and solution polymerization by using a radical initiator and, if necessary, a molecular weight adjuster or chain transfer agent. In the case where the copolymer is a graft copolymer, it is desirable that the rubber particle size be made less than 0.1 micron in diameter. The reason for this is that, if the particle size of rubber which happens to be present on the surface of the record disc is large, it will become a cause of noise. For the above mentioned graft copolymer, a graft copolymer of any number of stages of graft polymerization can be used.

When it is desired that the unsaturated nitrile copolymer be a mixture of a graft copolymer and a random copolymer, the mixture preferably comprises:

(1) 2–60 parts by weight of a graft copolymer of (a) 1–30 parts by weight of a rubber trunk polymer which is made predominantly of a conjugated diolefin or an alkyl acrylate containing 2–12 carbon atoms in the alkyl and (b) 1–30 parts by weight of a plastic component grafted onto the rubber trunk polymer, which plastic component has a composition comprising (i) 50–90% by weight of an unsaturated nitrile, (ii) 10–50% by weight of a monomer selected from the group consisting of alkyl acrylates or methacrylates having 1 to 8, preferably 1 to 4, carbon atoms in the alkyl, hydroxyalkyl acrylates or methacrylates having 1 to 8, preferably 2 to 4, carbon atoms in the alkyl, polyethyleneglycol acrylates or methacrylates having 23 or less, preferably 9 or less oxyethylene groups, acrylamide, methacrylamide, acrylic acid, methacrylic acid, vinyl acetate and alkylvinylethers having 1 to 4 carbon atoms in the alkyl, and (iii) 0–10% by weight of a monomer copolymerizable with the unsaturated nitrile, and (2) 40–98 parts by weight of a random copolymer of an unsaturated nitrile selected from the above group of (i) with a monomer selected from the above groups (ii) and (iii).

While the constituent resin of this invention is antistatic as it is, it is possible in some cases to further inprove this antistatic property by kneading an antistatic agent thereinto or by coating the resin with the antistatic agent.

In addition, additives such as pigments, a mold release agent or a demolder, a lubricant, and a processing aid can be added to the constituent resin of this invention.

Further specifications of the recording disc of this invention are: a Clash-Berg flex temperature of 50° to 120° C., preferably 55° to 120° C.; an absorbed impact energy of at least 0.5 kg.cm., preferably 0.7 kg. cm or more, in a test specimen of a thickness of 2 mm. when subjected to a Dynstat impact test according to BS-1330-1946; and a Shore D hardness of 75 to 95, preferably 80 to 95.

If the above mentioned Clash-Berg temperature exceeds 120° C., the forming characteristic of the resin will be poor. On the other hand, if this temperature is less than 50° C., the product will be undesirable in use. Furthermore, the static characteristic of the constituent resin of this invention is, in general, greatly affected by the moisture content of the resin. That is, the greater the moisture content, the smaller is the electrostatic charge potential, and the charge readily dissipates. Accordingly, as an approximate indication of the static characteristics of the resin, its water absorption can be used, a resin of a water absorption of from 0.2 to 1.5 percent, preferably from 0.2 to 1.0 percent, being generally used. A water absorption exceeding 1.5 percent is undesirable since it gives rise to softening due to water absorption, and since stretching variation also arises because of moisture absorption.

The above enumerated physical properties of the resin are measured in the following manner. For the above mentioned Dynstat impact test and the Shore hardness measurement, the test pieces were pretreated for three days under the standard state of a temperature of 23° ± 2° C. and a relative humidity of 50 ± 5 percent.

Flex temperature —
Measured by the Clash-Berg method according to ASTM D-1043 with the use of salad oil as a heat medium.

Dynstat impact test —
Carried out according to BS-1330-1946, with test pieces of 2-mm. thickness and 10-mm. width, under the standard state.

Shore hardness —
Measured according to ASTM, D2240-68, with a type D durometer, under the standard state.

Water absorption —
ASTM, D 570

The recording disc of this invention having the above stated composition and properties can be fabricated by a known forming process.

In order to indicate more fully the nature and utility of this invention, the following specific examples of practice constituting preferred embodiments of the invention and comparison examples are set forth, it being understood that these examples are presented as illustrative only and that they are not intended to limit the scope of the invention. Throughout these examples, quantities expressed in "parts" or "percent" are by weight.

EXAMPLE 1

A 10-liter stainless-steel autoclave with agitation vanes was charged with the following materials after the aqueous solution was adjusted to a pH of 5 with an aqueous solution of sulfuric acid.

| | |
|---|---|
| acrylonitrile | 75 parts |
| methyl acrylate | 25 parts |
| normal-dodecylmercaptan | 3.0 parts |
| potassium persulfate | 0.04 part |
| sodium hydrogensulfite | 0.01 part |
| sodium dodecylbenzenesulfonate | 1.0 part |
| deionized water | 300 parts |

The air within the autoclave was thoroughly purged with nitrogen, and the above charge was agitated for 15 hours at 50° C.

A latex thus formed was taken out of the autoclave and subjected to precipitation with an aqueous solution of aluminum sulfate. The resulting precipitate was thereafter adjusted to a pH of 7 with an aqueous solution of sodium pyrophosphate and, after dehydration and washing, was dried for 24 hours at 60° C., whereupon a white powder was obtained in a yield of 97 percent. This polymerization process will be designated by A.

The powder thus obtained was kneaded for 3 minutes will rolls with a surface temperature of 150° C. and then press formed at 160° C. and 100 kg./cm². pressure for 2 minutes into a record disc. Various physical properties of this record disc were measured by the methods set forth in Table 1, whereupon the results shown in Table 3 were obtained. All test pieces used in the Examples and Comparison Examples were pretreated by storing for 3 days under the conditions of a temperature of 23° C. and a relative humidity of 50 percent.

In addition, heat stability was determined by placing a sheet kneaded for 3 minutes with rolls at 150° C. in a Geer oven, an aging tester, at 165° C., and judging by naked eye the degree of coloration of the test pieces after 30 minutes and 60 minutes.

EXAMPLE 2

A 10-liter stainless-steel autoclave with agitation vanes was charged with the following materials after the aqueous solution pH was adjusted to 6.

| | |
|---|---|
| acrylonitrile | 63 parts |
| methyl acrylate | 27 parts |
| normal-dodecylmercaptan | 2.0 parts |
| potassium persulfate | 0.12 part |
| sodium hydrogensulfite | 0.03 part |
| sodium dodecylbenzenesulfonate | 1.0 part |
| disodium ethylenediaminetetraacetate | 0.001 part |
| deionized water | 300 parts |

The air within the autoclave was thoroughly purged with nitrogen, and then the following was added into the autoclave, the contents of which were agitated for 15 hours at 55° C.

| | |
|---|---|
| 1,3-butadiene | 10 parts |

To a latex thus formed, the following materials were added after they were mixed by agitation in a homogenizer.

| | |
|---|---|
| BHT* | 0.25 part |
| DLTDP** | 0.15 part |
| benzene | 0.25 part |
| 1 % aqueous solution of sodium dodecylbenzenesulfonate | 4.35 parts |

*2,6-ditertiary butyl-4-methylphenol
**dilaurylthiodipropionate

The resulting latex was taken out of the autoclave and subjected to precipitation with an aqueous solution of aluminum sulfate. The resulting precipitate was thereafter adjusted to a pH of 7 with an aqueous solution of sodium pyrophosphate and, after dehydration and washing, was dried at 50° C. for 24 hours. As a result, a white powder was obtained in a yield of 95 percent. This polymerization process will be designated by B.

The powder thus obtained was formed into a record disc in the same manner as in Example 1. The various physical properties of this record disc were measured by the methods set forth in Table 1, whereupon the results shown in Table 3 were obtained.

EXAMPLE 3

A 10-liter stainless-steel autoclave with agitation vanes was charged with the following materials.

| | |
|---|---|
| deionized water | 167 parts |
| formaldehyde sodium sulfoxylate | 0.2 part |
| ferrous sulfate heptahydrate | 0.003 part |
| disodium ethylenediamine tetraacetate | 0.003 part |
| 0.1 M/1 aqueous solution of acetic acid | 32 parts |
| 0.1 M/1 aqueous solution of sodium acetate | 1 part |
| sodium dodecylbenzene sulfonate | 0.2 part |

After thorough purging of the air within the autoclave with nitrogen, 7.5 parts of the following was added, and the agitation of the resulting mixture at 40° C. was started.

| 1,3-butadiene | 7.5 parts |
|---|---|

After 10 minutes from the start of agitation, a mixture of the following materials was added continuously to the above enumerated materials at a rate of 5.0 parts per hour.

| acrylonitrile | 50 parts |
|---|---|
| styrene | 35 parts |
| 1,10-dimercaptodecane | 0.6 part |
| diisopropylbenzenehydroperoxide | 0.2 part |

At the time when 30 parts of the above mixture had been added, the following materials were further added.

| 1,3-butadiene | 7.5 parts |
|---|---|
| formaldehyde sodium sulfoxylate | 0.1 part |

Upon completion of the addition of the entire quantity of the acrylonitrile and styrene monomer mixture, the following materials were immediately mixed by agitation in a homogenizer and added to the latex thus formed.

| BHT | 0.5 part |
|---|---|
| DLTDP | 0.25 part |
| benzene | 0.5 part |
| 1% aqueous solution of sodium dodecylbenzenesulfonate | 8 parts |

This polymerization process will be designated by C.

The resulting latex was subjected to precipitation with an aqueous solution of aluminum sulfate and adjusted to a pH of 7 with sodium pyrophosphate. The resulting precipitate was dehydrated and dried at 55° C. for 24 hours, whereupon a white powder was obtained in a yield of 92 percent.

This powder was formed into a record disc in the same manner as in Example 1. The physical properties and heat stability of this disc were determined, whereupon the results shown in Table 3 were obtained.

EXAMPLE 4

A 10-liter stainless-steel autoclave with agitation vanes was charged with an aqueous solution comprising the following ingredients after it was adjusted to a pH of 7 with an aqueous solution of potassium hydroxide.

| (a). | 1,3-butadiene | 30 | parts |
|---|---|---|---|
| | methyl methacrylate | 17.5 | " |
| | styrene | 2.5 | " |
| | tertiary dodecylmercaptan | 0.25 | part |
| | diisopropylbenzene hydroperoxide | 0.1 | " |
| | formaldehyde sodium sulfoxylate | 0.05 | " |
| | ferrous sulfate heptahydate | 0.002 | " |
| | disodium ethylenediaminetetraacetate | 0.003 | " |
| | sodiuim pyrophosphate | 0.25 | " |
| | sodium dodecylbenzene sulfonate | 0.25 | " |
| | deionized water | 150 | parts |

The air in the autoclave was thoroughly purged with nitrogen, and the above materials was agitated at 40° C. for 20 hours. As a result, a rubber latex of an average particle size of 0.07-micron diameter was obtained in a yield of 99 percent.

(b). To this latex of (a) above, the following materials were added.

| acrylonitrile | 30 | parts |
|---|---|---|
| ethyl acrylate | 20 | " |
| normal dodecylmercaptan | 0.6 | part |
| diisopropylbenzene hydroperoxide | 0.1 | " |
| formaldehyde sodium sulfoxylate | 0.05 | " |
| sodium dodecylbenzene sulfonate | 0.1 | " |
| deionized water | 150 | parts |

The air in the autoclave was purged with nitrogen, and the resulting mixture was agitated at 40° C. for 20 hours. The resulting latex was taken out of the autoclave, subjected to precipitation with an aqueous solution of aluminum sulfate, adjusted to a pH of 7 with an aqueous solution of sodium pyrophosphate, dehydrated, washed, and then dried at 55° C. for 24 hours. As a result a white powder was obtained in a yield of 96 percent. This polymerization process will be designated by D.

20 parts of this white powder and 80 parts of an acrylonitrile methyl acrylate copolymer of the white powder obtained in Example 1 were mixed in powder form, and the resulting mixture was roll-pressed to form a record disc similar to Example 1. The physical properties of the record disc were measured by the methods set forth in Table 1, whereupon the results shown in Table 3 were obtained.

EXAMPLE 5

To 40 parts of the rubber latex obtained according to Example 4 (10 parts as a rubber polymer) in the same autoclave as in Example 4, the following materials were added.

| acrylonitrile | 66 | parts |
|---|---|---|
| ethyl acrylate | 24 | " |
| normal dodecylmercaptan | 4.5 | " |
| potassium persulfate | 0.072 | part |
| sodium hydrogensulfite | 0.018 | " |
| sodium dodecylbenzenesulfonate | 0.82 | " |
| deionized water | 270 | parts |

The air in the autoclave was purged with nitrogen, and the above stated process materials were agitated at 50° C. for 20 hours thereby to effect graft copolymerization. The resulting latex was taken out of the autoclave, subjected to precipitation with an aqueous solution of aluminum sulfate, adjusted to a pH of 7 with an aqueous solution of sodium pyrophosphate, dehydrated, washed, and then dried at 55° C. for 24 hours. As a result, a white powder was obtained in a yield of 96 percent. This polymerization process will be designated by E.

In the same manner as in Example 1, this powder was formed into a record disc by roll pressing. The physical properties of this disc were determined by the methods set forth in Table 1, whereupon the results as shown in Table 3 were obtained.

EXAMPLES 6 THROUGH 23

The polymers and mixtures of polymers of the compositions set forth in Table 2 were polymerized in accordance with the indicated polymerization process selected from the processes of Examples 1 through 5, and each of the resulting resins was formed into a record disc similar to Example 1. The physical properties of these discs were measured by the methods set forth in Table 1, whereupon the results shown in Table 3 were obtained.

COMPARISON EXAMPLE 1

A mixture of 100 parts of a vinyl chloride-vinyl acetate copolymer resin (average degree of polymerization approximately 450, vinyl acetate content approximately 15 percent) for record discs, 0.8 part of a quaternary ammonium salt antistatic agent, 1 part of dibutyl tin diluarate and 0.5 part of carbon black were formed similar to Example 1. The results of measurements of the physical properties of the resulting product are shown in Table 3.

COMPARISON EXAMPLE 2

A mixture of 70 parts of a vinyl chloride-vinyl acetate copolymer resin (average degree of polymerization approximately 500, vinyl acetate content approximately 15 percent) for record disc, 30 parts of a vinyl chloride resin (average degree of polymerization approximately 700), 0.8 part of a quaternary ammonium salt antistatic agent, 1 part of a dibutyl tin dilaurate and 0.2 part of carbon black were formed similar to Example 1. The results of measurements of the physical properties of the resulting product are set forth in Table 3.

COMPARISON EXAMPLE 3

The procedure of Comparison Example 2 was carried out except that the antistatic agent was not used, whereupon the results shown in Table 3 were obtained.

Table 1.

| Physical properties and measurement thereof | |
| --- | --- |
| Physical Property | Measurement method and conditions |
| Hardness | Shore hardness tester (mfd. by Toyo Seiki), type D durometer, according to ASTM D 2240-68, 23° C, 50% RH. |
| Impact resistance | Dynstat impact testing machine, according to BS 1330-1946, 23° C, 50% RH, test specimen 10-mm width, 2-mm. thickness. |
| Tensile strength (yield point) | Cross Head speed 10% of specimen length/min., 23° C, 50% RH. |
| Abrasion resistance | Taber abrader (mfd. by Nippon Rigaku Kogyo), standard abrasion wheel CS-10 (mfd. by Teledyne Co., USA.), load 500 grams, abrasion indicated as abrasion quantity per 1,000 revolutions (g/1,000 r.), 23° C, 50% RH. |
| Flex temperature | Clash-Berg method specified in Japanese Industrial Standards JIS K-6745, (with salad oil as heat medium). |
| Fluidity | Koka type flow tester, nozzle 1-mm. diam. × 10 mm., load 100 kg/cm$^2$, temperature rise rate 3° C/min., fluidity expressed as temperature (° C) at which apparent viscosity is 10$^5$ poise. |
| Frictional static characteristic | Kyoto University Chem. Res. Inst. type rotary static tester, 430 rpm., indication as electrostatic charge potential (V) after 1 min. of frictional rubbing, 23° C, 50% RH. |
| Auditory sensation | Tested under the conditions of reproduction with a diamond stylus with a tip raddius of 0.18 ± 0.003 mm. applied with a stylus force of 2 g. |

Table 2.

Compositions of record discs of this invention (units: parts by weight)

| Example | Polymerization process | Unsaturated nitrile random copolymer constituents | | | | | | | | | | | | | Polymerization monomer process | Unsaturated nitrile graft copolymer | | | | | | |
|---|---|---|---|---|---|---|---|---|---|---|---|---|---|---|---|---|---|---|---|---|---|---|
| | | AN | MA | FA | BA | ST | MMA | But | acrylic acid | acrylamide propde | VAC | EAOH | PEGA | | Rubber trunk polymer | | | | | Graft | |
| | | | | | | | | | | | | | | | But | BA | MMA | ST | 1,3BD | AN | EA |
| 1 | A | 75 | 25 | | | | | | | | | | | | | | | | | | |
| 2 | B | 63 | 27 | | | | | 10 | | | | | | | | | | | | | |
| 3 | C | 50 | 20 | | | 35 | | 15 | | | | | | | | | | | | | |
| 4 | A | 60 | | | | | | | | | | | | | | | | | | | |
| 5 | A | 60 | 40 | | | | | | | | | | | | | | | | | | |
| 6 | A | 70 | 20 | 30 | | | | | | | | | | D | 6 | | 3.5 | 0.5 | | 6 | 4 |
| 7 | A | 70 | 20 | | 10 | | | | | | | | | E | 6 | | 3.5 | 0.5 | | 66 | 24 |
| 8 | A | 70 | 25 | | | | 20 | | | | | | | | | | | | | | |
| 9 | A | 70 | 25 | | | | | | 5 | | | | | | | | | | | | |
| 10 | A | 70 | 25 | | | | | | | 5 | | | | | | | | | | | |
| 11 | A | 45 | 15 | | | | | | | | 5 | | | | | | | | | | |
| 12 | A | 48 | 32 | | 8 | | | | | | | | | D | 12 | | 7 | 1 | | 12 | 8 |
| 13 | A | 56 | 16 | | | | | | | | | | | D | 6 | | 3.5 | 0.5 | | 6 | 4 |
| 14 | A | 60 | 20 | | | | | | | | | | | D | 6 | | 3.5 | 0.5 | | 6 | 4 |
| 15 | B | 57 | 38 | | | | | | | | | | | D | | 10 | | | 0.001 | | |
| 16 | B | 66 | | 29 | | | | 5 | | | | | | | | | | | | | |
| 17 | C | 54 | 14 | | | 36 | | 5 | | | | | | | | | | | | | |
| 18 | C | 41 | | | | 35 | 15 | 10 | | | | | | | | | | | | | |
| 19 | C | 40 | | | | 35 | | 10 | | | | | | | | | | | | | |
| 20 | A | 70 | 25 | | | | | | | | | 5 | | | | | | | | | |
| 21 | A | 70 | 25 | | | | | | | | | | 5 | | | | | | | | |

Abbreviations used in Table 2
AN: acrylonitrile
MA: methyl acrylate
EA: ethyl acrylate
BA: butyl acrylate
ST: styrene
MMA: methyl methacrylate
But: butadiene
VAC: vinyl acetate
EAOH: β-hydroxyethyl acrylate
PEGA: polyethyleneglycol acrylate
1,3BD 1,3-butanediol diacrylate Table 3.

| | | Coloration due to heat stability aging test | | Hardness | Impact resistance (kg.cm) (kg/cm²) | Tensile strength (mg/1000 cycles) | Abrasion quantity by Taber Abrasion test (° C) | Flex temp. (° C) | Fluidity (° C) | Frictional static potential sensation (V) | Auditory |
|---|---|---|---|---|---|---|---|---|---|---|---|
| | | After 30 min. | After 60 min. | | | | | | | | |
| Ex. | 1 | colorless | light yellow | 95 | 1.3 | 790 | 18 | 74 | 158 | 660 | High tones good |
| " | 2 | " | " | 80 | 2.4 | 550 | 22 | 55 | 160 | 540 | High tones fair |
| " | 3 | " | yellow | 75 | 2.6 | 490 | 24 | 70 | 158 | 730 | Standard |
| " | 4 | " | light yellow | 90 | 2.4 | 650 | 21 | 72 | 160 | 640 | High tones good |
| " | 5 | " | " | 90 | 3.1 | 580 | 24 | 60 | 156 | 610 | " |
| " | 6 | " | " | 85 | 1.4 | 720 | 23 | 60 | 153 | 630 | High tones fair |
| " | 7 | " | " | 85 | 1.4 | 730 | 22 | 62 | 155 | 640 | " |
| " | 8 | " | " | 85 | 1.3 | 710 | 21 | 62 | 154 | 620 | " |
| " | 9 | " | " | 95 | 1.1 | 810 | 18 | 80 | 163 | 670 | High tones good |
| " | 10 | " | " | 95 | 1.0 | 790 | 18 | 74 | 161 | 280 | " |
| " | 11 | " | " | 95 | 1.0 | 800 | 18 | 73 | 160 | 280 | " |
| " | 12 | " | " | 90 | 1.5 | 750 | 19 | 70 | 155 | 660 | " |
| " | 13 | " | " | 85 | 4.5 | 570 | 24 | 68 | 163 | 560 | High tones fair |
| " | 14 | " | " | 85 | 2.8 | 570 | 25 | 58 | 153 | 400 | " |
| " | 15 | " | " | 85 | 2.5 | 550 | 24 | 60 | 155 | 440 | |
| " | 16 | " | " | 90 | 2.3 | 570 | 24 | 58 | 155 | 570 | High tones good |
| " | 17 | " | light yellow | 85 | 1.4 | 610 | 21 | 55 | 155 | 370 | High tones fair |
| " | 18 | " | " | 80 | 1.7 | 580 | 23 | 58 | 163 | 600 | " |
| " | 19 | " | " | 80 | 1.8 | 520 | 23 | 80 | 164 | 660 | " |
| " | 20 | " | " | 80 | 2.2 | 540 | 23 | 70 | 162 | 580 | " |
| " | 21 | " | " | 75 | 2.4 | 510 | 23 | 78 | 168 | 640 | Standard |
| Ex. | 22 | colorless | light yellow | 90 | 1.2 | 780 | 18 | 70 | 158 | 280 | High tones good |
| | 23 | " | " | 85 | 1.1 | 760 | 19 | 70 | 156 | 250 | " |
| Comparison ex. | 1 | yellow | black brown | 75 | 1.0 | 450 | 28 | 50 | 149 | 1040 | Standard |
| " | 2 | " | " | 75 | 1.2 | 510 | 25 | 55 | 167 | 1420 | " |
| " | 3 | " | " | 75 | 1.2 | 510 | 25 | 55 | 167 | 2200 | much noise |

As is apparent also from the foregoing description with respect to the Examples and Comparison Examples, the resin record disc of this invention possesses the following advantageous features, which could not be attained in the record disc resin compositions used or proposed heretofore such as those of vinyl chloride resins, polystyrene resins, and polyacrylic resins.

1. The record disc of this invention is of antistatic character. Any dust settling on this record can be removed simply by blowing with the mouth, and there is no necessity of using a cleaner as heretofore.

2. The resin is homogeneous since there is no necessity of using additives and since the resin is amorphous, whereby there is no deleterious effect on the tone quality of the reproduced sound. Since the resin is also optically uniform, isotropic, and transparent, a product of high performance can be obtained even in the case of a video disc for optical detection.

3. A vinyl chloride-vinyl acetate copolymer has poor heat stability. For this reason, its forming temperature cannot be made high, and it must be formed with a low degree of polymerization. As a consequence, its various properties such as impact resistance and wear resistance are adversely affected. In contrast, the constituent resin of this invention has good heat stability. Accordingly, a high forming temperature can be used to increase its fluidity, and since a resin of a higher degree of polymerization can be used, its various properties can be improved.

4. Record discs in which polystyrene resins or polymethacrylate resins are used have certain properties which are poor and therefore cannot be practically used in a wide range of applications. In contrast, the various properties of the record disc of this invention can be adjusted as desired by suitably selecting the kind and quantity of the monomers. Accordingly, record discs, in which a good balance of several properties is required, can be made to have a high performance.

For example, by causing the flex or Clash-Berg temperature to be high, warping and waviness due to heat can be prevented, and shortening of the forming cycle can be attained. At the same time, the impact resistance, wear resistance, and formability are good.

5. By increasing the hardness of the record disc, the high frequency characteristic thereof can be improved. For example, the high frequency characteristic can be thus improved, with almost no variation of the phonograph and reproducing system used at present, by so selecting the monomers within the scope of this invention that the Shore hardness will be from 80 to 95 at 25° C. and 50 percent relative humidity with a type D durometer hammer according to ASTM D2240-68. At the same time, other good properties such as the heat stability and formability of the resin are also obtained.

Furthermore, as measured by the method specified in Table 1, the flow starting point of the resin of this invention is from 110° to 150° C., and the fluidity is from 140° to 170° C. Thus, this resin exhibits a fluidity characteristic which is substantially the same as a vinyl chloride-vinyl acetate copolymer. Accordingly, a further advantageous feature of the record disc of this invention is that it can be formed by means of a conventional record disc forming apparatus.

We claim:

1. An information signal recording disc comprising at least one nitrile copolymer having therein an unsaturated nitrile content of from 40 to 90 percent by weight wherein the unsaturated nitrile units of the copolymer are selected from the group consisting of acrylonitrile, methacrylonitrile, and mixtures thereof, said disc exhibiting a Clash-Berg flex temperature of from 50° to 120° C., an absorbed impact energy of at least 0.5 kg.cm.

when tested with a test specimen thereof of a 2-mm. thickness by a Dynstat impact test according to BS-1330-1946, and a Shore D hardness of from 75 to 95.

2. An information signal recording disc as claimed in claim 1 in which the unsaturated nitrile content of the nitrile copolymer is from 50 to 85 percent by weight.

3. An information signal recording disc as claimed in claim 1 in which, the nitrile copolymer is made up of said unsaturated nitrile and at least one monomer selected from the group consisting of alkyl acrylates, alkyl methacrylates, acrylic acid, methacrylic acid, acrylamide, methacrylamide, hydroxyalkyl methacrylate, polyethylene glycol acrylate, polyethyleneglycol methacrylate, acrylamide, vinyl acetate, and alkylvinylethers.

4. An information signal recording disc as claimed in claim 1 in which the nitrile copolymer is a random copolymer comprising 40 to 90 percent of the unsaturated nitrile, from 1 to 30 percent of a conjugated diolefin, and from 0 to 59 percent of another monomer copolymerizable with the unsaturated nitrile, all quantities in percent being by weight.

5. An information signal recording disc as claimed in claim 1 in which the nitrile copolymer is a graft copolymer formed by graft polymerizing from 99 to 70 parts of a monomer mixture comprising from 40 to 90 percent of said unsaturated nitrile and from 10 to 60 percent of a monomer copolymerizable with the unsaturated nitrile onto from 1 to 30 parts of a rubber-trunk polymer composed principally of conjugated diolefin or alkyl acrylate units, all quantities in percent and parts being by weight.

6. An information signal recording disc as claimed in claim 5 in which the rubbertrunk polymer is composed principally of a conjugated diolefin.

7. An information signal recording disc as claimed in claim 5 in which the rubbertrunk polymer is composed principally of an alkyl acrylate.

8. An information signal recording disc as claimed in claim 1 in which the nitrile copolymer is a mixture of a random copolymer and a graft copolymer.

9. An information signal recording disc as claimed in claim 8 in which the mixture of the random copolymer and a graft copolymer comprises:

(1) 2–60 parts by weight of a graft copolymer of (a) 1–30 parts by weight of a rubber trunk polymer which is made predominantly of a conjugated diolefin or an alkyl acrylate containing 2–12 carbon atoms in the alkyl and (b) 1–30 parts by weight of a plastic component grafted onto the rubber trunk polymer, which plastic component has a composition comprising (i) 50–90% by weight of an unsaturated nitrile selected from the group consisting of acrylonitrile, methacrylonitrile, and mixtures thereof, (ii) 10–50% by weight of a monomer selected from the group consisting of alkyl acrylates or methacrylates having 1 to 8, preferably 1 to 4, carbon atoms in the alkyl, hydroxyalkyl acrylates or methacrylates having 1 to 8, preferably 2–4, carbon atoms in the alkyl, polyethylene glycol acrylates or methacrylates having 23 or less, preferably 9 or less oxyethylene groups, acrylamide, methacrylamide, acrylic acid, methacrylic acid, vinyl acetate and alkylvinylethers having 1 to 4 carbon atoms in the alkyl, and (iii) 0–10% by weight of a monomer copolymerizable with the unsaturated nitrile, and (2) 40–98 parts by weight of a random copolymer of an unsaturated nitrile selected from the above group of (i) and a monomer selected from the above groups (ii) and (iii).

10. An information signal recording disc as claimed in claim 1, in which the unsaturated nitrile is acrylonitrile.

* * * * *